(12) United States Patent
Nichols et al.

(10) Patent No.: US 10,952,376 B1
(45) Date of Patent: Mar. 23, 2021

(54) ORCHARD SANITATION IMPLEMENT

(71) Applicant: Hotspot Ag, Inc., Hanford, CA (US)

(72) Inventors: James Nichols, Visalia, CA (US);
Richard Brock, Hanford, CA (US);
Terry Kwast, Corcoran, CA (US)

(73) Assignee: Hotspot AG, Inc., Hanford, CA (US)

( * ) Notice: Subject to any disclaimer, the term of this patent is extended or adjusted under 35 U.S.C. 154(b) by 0 days.

(21) Appl. No.: 16/805,739

(22) Filed: Feb. 29, 2020

(51) Int. Cl.
*B02C 18/06* (2006.01)
*A01D 43/08* (2006.01)
*B02C 18/00* (2006.01)
*A01D 43/063* (2006.01)
*A01D 51/00* (2006.01)

(52) U.S. Cl.
CPC ......... *A01D 43/086* (2013.01); *A01D 43/063* (2013.01); *A01D 43/088* (2013.01); *A01D 51/002* (2013.01); *B02C 18/0084* (2013.01); *B02C 18/06* (2013.01); *B02C 2201/066* (2013.01)

(58) Field of Classification Search
CPC .............................. A01D 51/002; A01D 51/00
See application file for complete search history.

(56) References Cited

U.S. PATENT DOCUMENTS

| | | | |
|---|---|---|---|
| 3,295,299 A | 1/1967 | Brady et al. | |
| 3,647,150 A * | 3/1972 | Stephanek | B02C 23/08 241/75 |
| 4,361,436 A | 11/1982 | McCarthy et al. | |
| 5,001,893 A * | 3/1991 | Stanley | A01D 51/002 56/16.5 |
| 5,137,219 A | 8/1992 | Morey | |
| 5,300,438 A | 4/1994 | Augspurger | |
| 5,373,688 A * | 12/1994 | Stanley | A01D 51/002 56/328.1 |
| 5,669,213 A | 9/1997 | Britton | |
| 6,658,830 B2 | 12/2003 | Wetzel | |

(Continued)

FOREIGN PATENT DOCUMENTS

DE 102008023567 A1 * 11/2009 ............. B07B 13/18

OTHER PUBLICATIONS

Willibald, Translation of DE-102008023567-A1 (Year: 2009).*

(Continued)

*Primary Examiner* — Adam J Eiseman
*Assistant Examiner* — Bobby Yeonjin Kim
(74) *Attorney, Agent, or Firm* — James M. Duncan; Scanlon Duncan LLP (57) ABSTRACT

An orchard sanitation implement disposes of unharvested nuts which may otherwise be utilized as habitat and food for navel orangeworms. Unharvested nuts are lifted from the orchard floor and delivered to a storage bin of the implement. Once received within the storage bin, the unharvested nuts are separated from other orchard debris by a looping belt which allows unharvested nuts to fall through, but other orchard debris is conveyed outside of the storage bin for deposit either into a container or back to the orchard floor. The unharvested nuts fall through openings in the looping belt, through an outlet at the bottom of the storage bin and into a shredding unit attached to the outlet. The shredding unit shreds and pulverizes the unharvested nuts into a composition which is too small to be utilized by navel orangeworms for habitat or a source of food.

1 Claim, 6 Drawing Sheets

(56) References Cited

U.S. PATENT DOCUMENTS

| | | |
|---|---|---|
| 6,659,378 B2 | 12/2003 | Di Anna |
| 8,056,313 B1 | 11/2011 | Flora et al. |
| 2008/0072997 A1 | 3/2008 | Thompson |
| 2013/0219847 A1 | 8/2013 | Miller |

OTHER PUBLICATIONS

Midland Tractor, Flory CC70 Conditioner, https://www.youtube.com/watch?v=036H2sbMdVA (Year: 2020).*

G. Steven Sibbett, Robert A. Van Steenwyk, Shredding "mummy" walnuts is key to destroying navel orangeworm in winter, California Agriculture, Sep.-Oct. 1993, pp. 26-28, vol. 47, No. 5.

Robert H. Beede, Pistachios Suffer Navel Orangeworm Damage, California AG Today, Nov. 8, 2017.

Crystal Nay, Walnut Pest Management: Navel Orangeworm and Codling Moth, West Coast Nut, Oct. 8, 2019.

\* cited by examiner

ORCHARD SANITATION IMPLEMENT

BACKGROUND OF THE INVENTION

The navel orangeworm (*Lepidoptera:Pyralidae*) is the most destructive pest to California tree nut orchards. The navel orangeworm feeds on a variety of fruits and nuts (collectively referred to herein at times as "fruit" or "nuts", which terms are used interchangeably herein). Navel orangeworm does not over winter in the egg and is dependent for survival to overwinter as larvae in unharvested nuts left on the tree or on the ground. The caterpillars burrow into the fruit, thereby damaging the kernel and contaminate the fruit with frass (insect excrement) and webbing, and facilitate the entry of the *Aspergillus flavus* fungus, which produces a carcinogenic mycotoxin.

Navel orangeworm is the most damaging caterpillar to pistachios, resulting in damages of millions of dollars per year. Almonds, figs, pomegranates, and walnuts are also major hosts. The pistachio nut is susceptible to navel orangeworm infestation as soon as hull split occurs. The first signs of an infestation are small, pinhole-size entrances into the nutmeat. As worms grow in size, the entire nut is fed upon and extensive amounts of webbing and frass are present.

The most critical control procedure is orchard sanitation, which means destroying unharvested nuts or fruit from the prior harvest. Any nuts left on the orchard floor after harvesting (referred to hereinafter as "unharvested nuts") can provide food and habitat for the pest. Therefore, any unharvested nuts left on the orchard floor need to be collected and destroyed. This hygiene includes shaking the trees during the dormant season to remove any remaining unharvested or "mummy" nuts from the trees.

Among the devices utilized for destroying the unharvested nuts are flail mowers and disk implements. However, these devices are inconsistent in destroying all of the harvested nuts laying on the orchard floor. In some cases, the utilized devices fail to collect some of the unharvested nuts. In other cases, some of the nuts which are collected are not adequately destroyed to prevent the nuts from being used as habitat and food by the navel orangeworms. For example, rather than pulverizing the nuts, flail mowers can propel whole nuts to another part of the orchard floor. In other cases, the nuts do go through the device but are not sufficiently pulverized to prevent the nuts from being utilized for habitat or food by the pests.

SUMMARY OF THE INVENTION

A solution to the above described problem is provided by embodiments of the disclosed apparatus and method. An embodiment of an implement for use in an orchard for receiving and shredding a plurality of unharvested nuts has a collection apparatus which collects the plurality of unharvested nuts. An acceptable collection apparatus may be a harvesting unit. The harvesting units typically have structural members at the front of the units, such as revolving brushes or blowers which gather nuts inward to a position where the harvesting units goes directly over the gathered nuts. In addition to nuts, the collection apparatus will also gather other orchard debris, such as tree branches, brush, dirt clods, etc.

Once the gathered nuts and orchard debris have been directed to the underside of the harvester, the harvesting unit will utilize lifting devices, such as pick-up belts, conveyors, or vacuums to gather the collected nuts and debris The collected nuts and debris are transported to the rear of the harvester by a series of conveyors and/or belts and delivered to the disclosed implement. However, it is to be appreciated that other devices and means may be utilized to deliver the unharvested nuts to the disclosed implement. For example, the implement itself may have integral brushes and lifting chains for delivering the nuts and orchard debris into the implement. Alternatively, nuts and orchard debris may be delivered manually to embodiments of the disclosed implement.

Embodiments of the disclosed implement will typically be towed, although a self-propelled embodiment may also be configured by those skilled in the art of the invention. If a harvester is utilized to collect the unharvested nuts and orchard debris, the harvester will typically be towed by a tractor, and the implement towed by the harvester utilizing a three-point hitch. Hydraulic power required by the implement may be self-contained, with a motor-pump package contained on the implement itself. Alternatively, the motor-pump package may be contained on the tow vehicle (harvester, tractor, or other towing apparatus, with hydraulic hoses run to the implement to operate various devices requiring hydraulic power, such as power cylinders and hydraulic motors which may be utilized to drive the looping chain and shredding units described below.

The implement has one or more storage bins which are configured to receive the plurality of unharvested nuts and the assortment of orchard debris picked up from the ground surface of the orchard. The storage bin has a front, a rear, a top, a bottom, and a plurality of side walls. The bottom of the storage bin has an open outlet. The plurality of side walls may have a funnel configuration which directs unharvested nuts into the open outlet. The storage bin may further comprise deflector plates which direct nuts and debris being delivered to the storage bin by the collection apparatus.

A looping chain may be disposed within the storage bin. A driving mechanism is attached to the looping chain, which allows the looping chain to rotate in an endless loop configuration. While the looping chain may be disposed such that the looping chain is oriented with a top side of the chain traversing in a loop extending from the front to the rear of the storage bin, it is to be appreciated that the looping chain may also be configured with the loop extending from side-to-side of the storage bin. The looping chain has a plurality of openings where the openings are sized such that as the looping chain rotates, at least a portion of the unharvested nuts pass through the plurality of openings and drop into the bottom of the storage bin. Assorted debris collected from the orchard floor larger than the unharvested nuts is conveyed by the looping chain to a position outside of the storage bin, such as to a debris container located at either the rear of the implement or to the side, depending upon the orientation of the looping chain. Alternatively, the assorted debris may simply be transported over the side of the storage bin by the looping chain to the ground surface for subsequent collection.

Embodiments of the invention may also have a shaker which works in conjunction with the looping chain to facilitate separation of unharvested nuts from other orchard debris.

Embodiments of the invention may also have a shredding unit which has an inlet disposed adjacent to the open outlet of the storage bin. The shredding unit is configured to receive and shred the unharvested nuts which enter into it. Upon being shredded, the shredded or pulverized nuts are discharged to the ground surface of the orchard. The shredded fragments will typically have a size no larger than $5/16^{th}$ of an inch. The shredded fragments are small enough that there is no remaining part of the nut which may be utilized by navel orangeworm for food or habitat. The shredded fragments may be left in windrows directly below the implement as it moves. The shredded fragments may be utilized as a compost material which is spread across the orchard floor or collected.

The shredding unit will typically comprise a plurality of radial blades which are configured side-by-side along a blade shaft. The blade shaft may be oriented such that it is in alignment with a lengthwise axis (i.e., front to rear) of the implement. The shredding units will typically operate at a relatively low speed, ranging from 30-60 RPM. The controls of the shredding unit may be configured such that if the shredder jams up, it will reverse itself at least four times in an effort to unjam, and then shutdown if the jam cannot be cleared.

The implement has a chassis which supports the storage bin, shredding unit, and other components of the implement. The chassis will be supported by wheels which engage the ground surface.

A method of reducing crop loss in an orchard from navel orangeworm is also disclosed. Embodiments of the method comprise collecting debris from a ground surface of the orchard, where the debris, for purposes of the method, may comprise unharvested nuts, tree branches, brush, leaves and dirt clods.

DETAILED DESCRIPTION OF THE INVENTION

Figure 1:
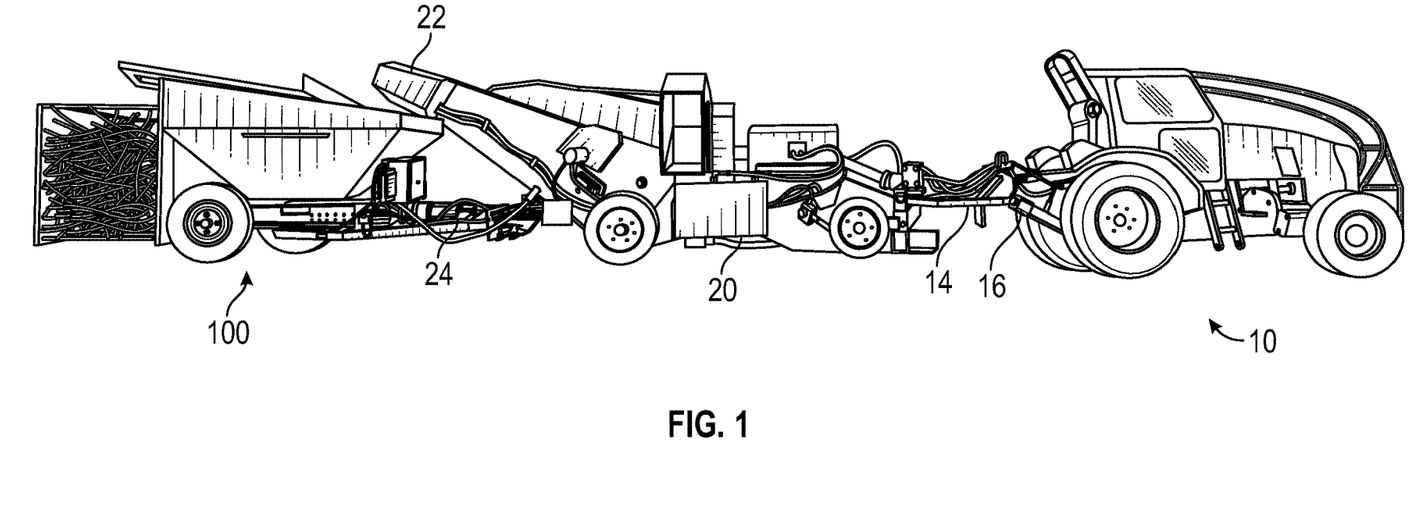
FIG. 1 depicts a tractor towing a harvester and an embodiment of the disclosed orchard sanitation implement.

Referring now to the Figures, FIG. 1 depicts a configuration of a tractor 10, harvester 20, and an embodiment of the disclosed orchard sanitation implement 100 disclosed herein. As shown in FIG. 1, in this configuration the tractor 10 is towing the harvester 20 with a three-point hitch 12 and a power takeoff 16 is utilized to drive the system hydraulics on the harvester 20. Harvester 20 utilizes brushes or blowers to direct nuts and orchard debris to a position below the harvester, where a collection chain, conveyor or vacuum will pick up the nuts and orchard debris, ultimately delivering the nuts and orchard debris to the orchard sanitation implement 100 through chute 22. Orchard sanitation implement 100 is connected to harvester 12 by hitch 24

Figure 2:
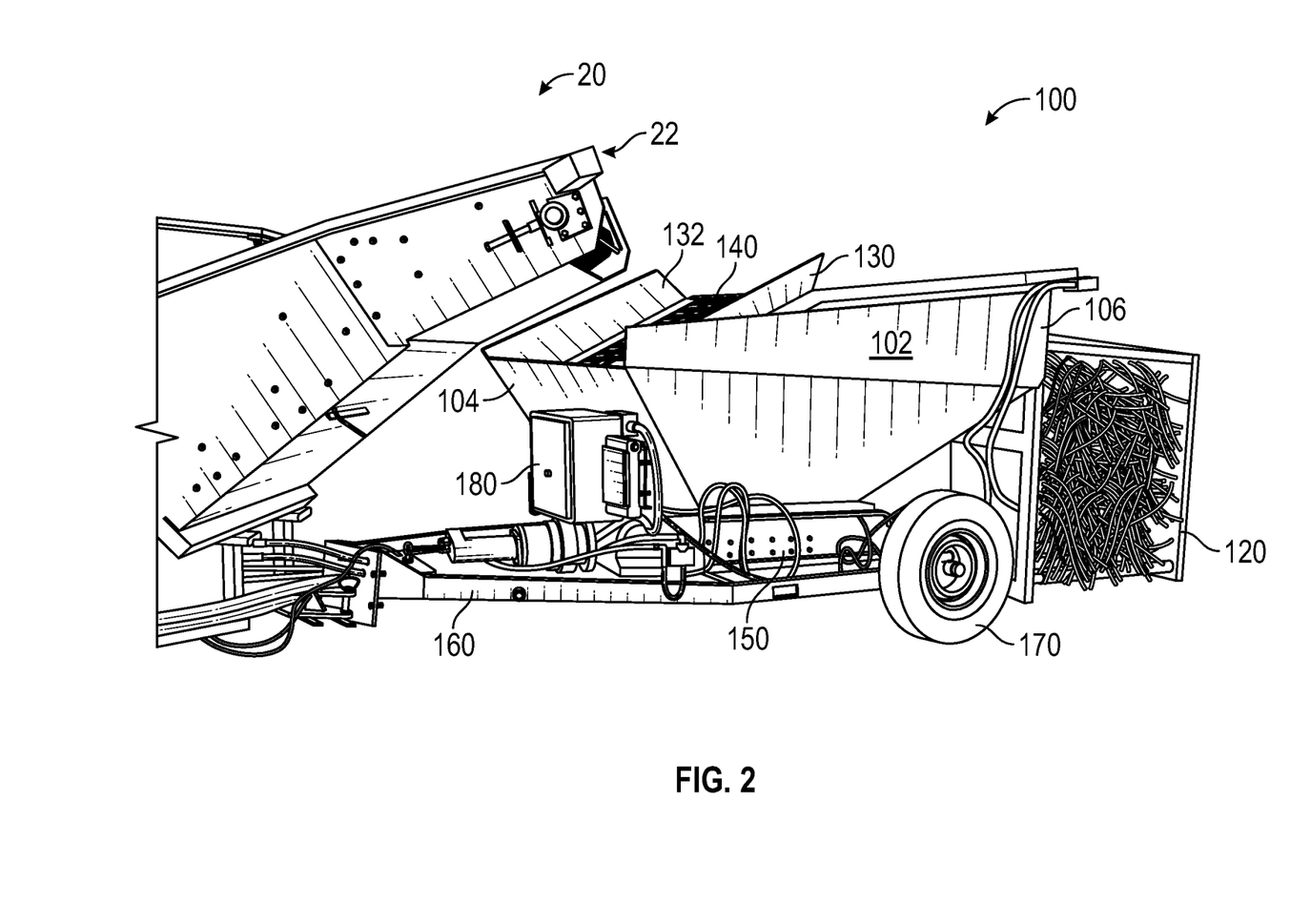
FIG. 2 depicts a side view of a harvester in position to deposit unharvested nuts and other materials into an embodiment of the disclosed orchard sanitation implement.

FIG. 2 depicts an embodiment of the orchard sanitation implement 100 wherein the harvester 20 acts a collection apparatus for the implement. Harvester 20 has a discharge chute 20 which deposits unharvested nuts and other orchard debris into the storage bin 102 of the implement 100. Storage bin 102 has a front 104, a rear 106, a plurality of side walls 108, and, as shown on FIG. 6, a bottom 110 which forms an outlet. The embodiment of the implement 100 depicted in FIG. 1 also has a left-side deflector plate 130 and a right-side deflector plate 132 which deflect unharvested nuts and orchard debris onto looping chain 140. FIG. 2 further depicts an embodiment of the implement 100 having a debris container 120 attached at the rear 106 of the storage bin 102, although it is to be appreciated that debris container 120 may also be attached at a side of the storage bin if looping chain 140 is configured in a side-to-side configuration as opposed to the front 104 to rear 106 configuration depicted in FIG. 2. The embodiment of the implement depicted in FIG. 2 also has a shredding unit 150 disposed beneath the storage bin 102. The shredding unit 150, storage bin 102, and other components of this embodiment of the implement 100 are supported by chassis 160. Chassis 160 has ground engaging wheels 170. Some of the circuits, relays, and other devices required for remote operation for this embodiment of the implement 100 may be contained within control box 180. These controls allow remote operation of the looping chain 140 and the shredding unit 150 by an operator located in tractor 10.

Figure 3:
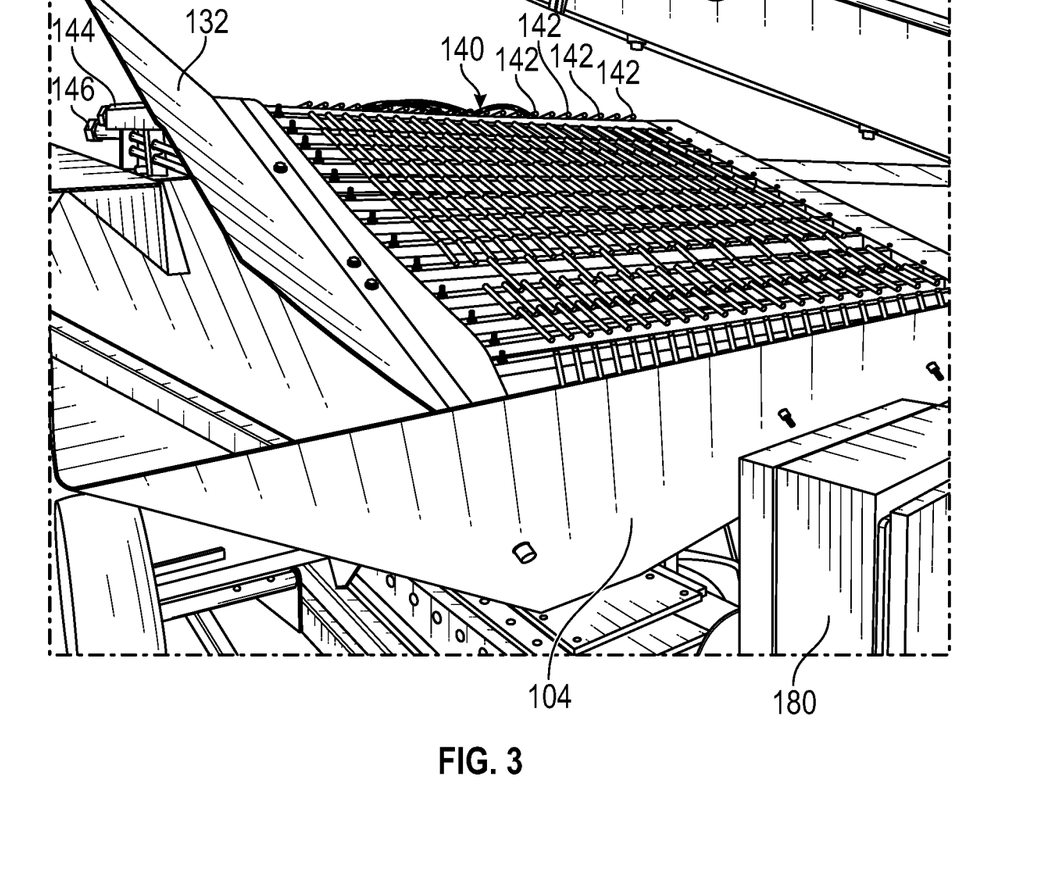
FIG. 3 depicts an embodiment of a looping chain disposed within a storage bin of an embodiment of the disclosed orchard sanitation implement.

FIG. 3 shows a detailed view of looping chain 140. Looping chain 104 has a plurality of openings 142 which are sized such that as the looping chain rotates, all or a substantial portion of the collected unharvested nuts fall through the openings into the portion of the storage bin 102 below the chain. Looping chain 140 is mounted on a frame 144 and is driven by a drive mechanism 146 which will typically be rotated by a hydraulic motor (not shown).

Figure 4:
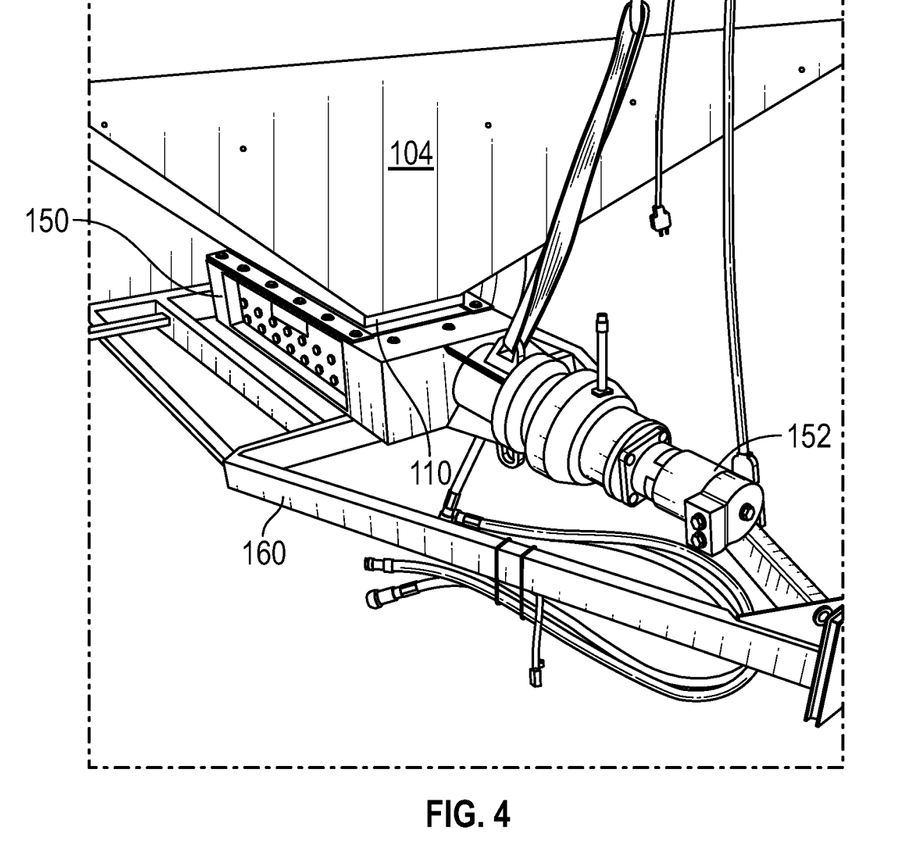
FIG. 4 depicts a front lower view of an embodiment of the disclosed orchard sanitation implement.

FIG. 4 shows an exterior view of the front of an embodiment of an implement 100, showing the positioning of shredding unit 150 as attached to the bottom 110 of storage bin 102. Shredding unit 150 is operated by a hydraulic motor 152.

Figure 5:
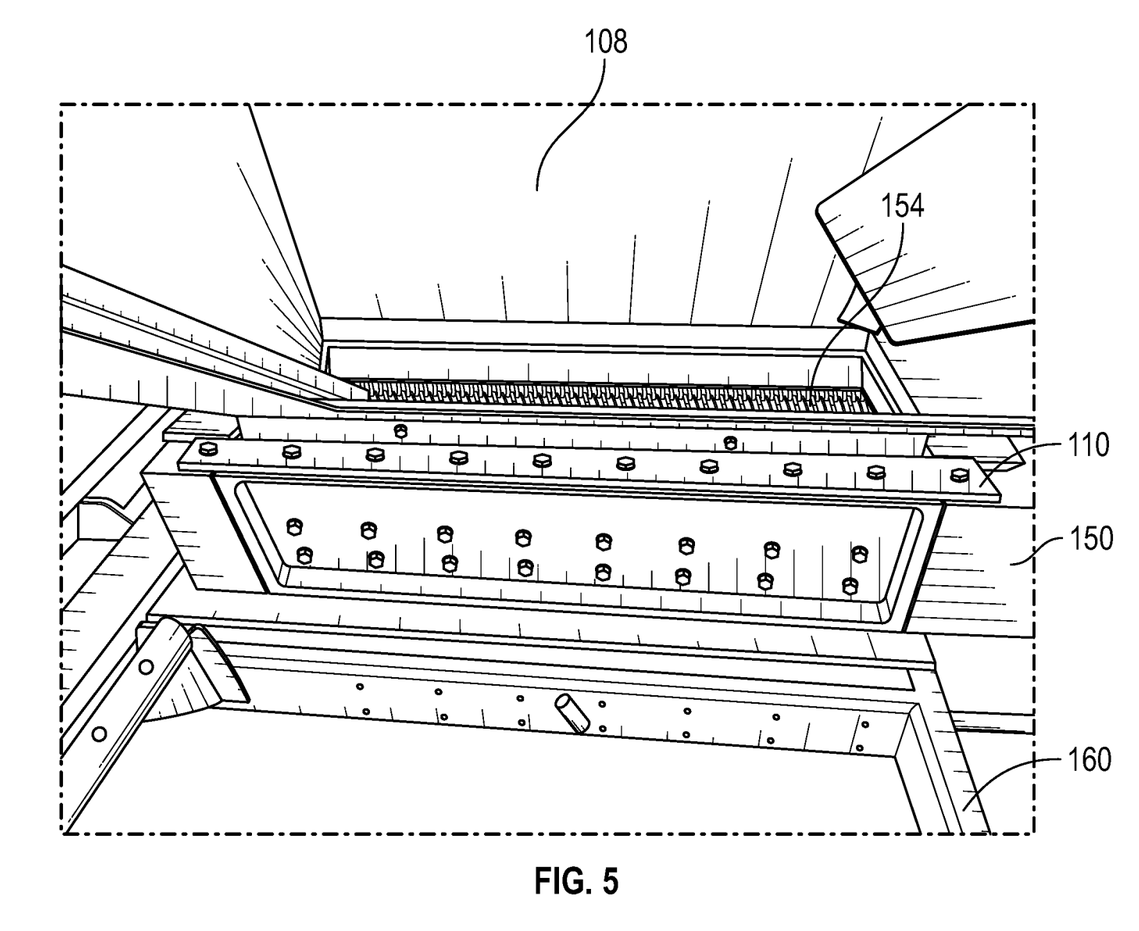
FIG. 5 depicts a side view of disclosed orchard sanitation implement, with a portion of a storage bin sidewall removed to show the shredding unit.

FIG. 5 shows a side view of the bottom 110 of the storage bin, with a panel removed from a side 108 of the storage bin to show the inlet into the shredding unit 150. As shown in FIG. 5, shredding unit 150 has a plurality of radial blades 154 which are disposed along a shaft which is in axial alignment along an axis defined from the front 104 to rear 106 of the storage bin. Shredding unit will typically operate at speeds of 30 to 60 RPM, with an optimal rotational speed of approximately 48 RPM. The shredder will shred the unharvested nuts into a compost-like texture with no fragments larger than $5/16^{th}$ inch. These fragments drop out through the bottom of the shredder 150 directly onto the ground surface beneath the implement. The fragments may thereafter be picked or left in place as compost, leaving no nut fragment large enough to provide food or habitat for navel orangeworms.

Figure 6:
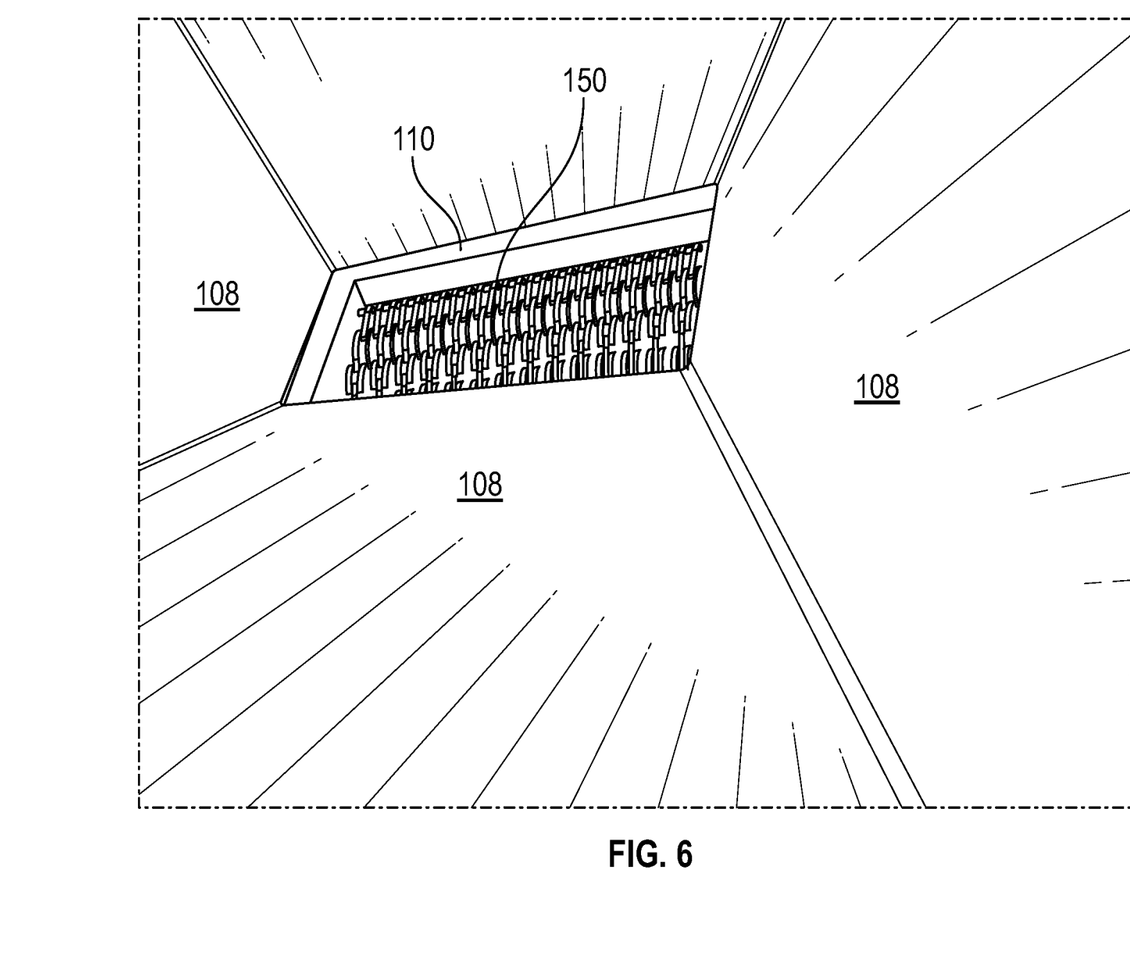
FIG. 6 depicts a downward looking view into the storage bin showing the shredding unit disposed at the outlet of the storage bin.

As shown in FIG. 6, the interior of the storage bin 102 may have side walls which funnel unharvested nuts into the outlet 110 of the storage bin into shredder 150.

Having thus described the preferred embodiment of the invention, what is claimed as new and desired to be protected by Letters Patent includes the following:

1. A method of reducing crop loss from navel orangeworm, the method comprising:
    collecting debris from a ground surface of an orchard, the debris comprising unharvested nuts utilized by the navel orangeworms for food and habitat, tree branches, and other material;
    depositing the debris into a towable implement, the towable implement comprising a bin and a looping chain disposed in the bin, the looping chain comprising a drive mechanism which causes the looping chain to rotate, the looping chain further comprising a plurality of openings, the plurality of openings configured such that, while the looping chain is rotating, substantially all of the unharvested nuts pass through the looping chain into a bottom of the bin while substantially all of the tree branches and other material are conveyed to a side of the bin and deposited outside of the bin, the implement further comprising a shredding unit attached at a bottom of the bin, the shredding unit comprising an inlet configured to receive any of the unharvested nuts which pass through the looping chain;

starting the drive mechanism to cause the looping chain to rotate, allowing unharvesting nuts to fall into the inlet of the shredder;

activating the shredder to shred the unharvested nuts into a compost material having a particle size no larger than $5/16$ inch; and depositing the compost material onto the ground surface of the orchard.

\* \* \* \* \*